Figure 1:

United States Patent [19]

Hodge

[11] Patent Number: 4,528,275
[45] Date of Patent: Jul. 9, 1985

[54] MULLITE-CORDIERITE COMPOSITE CERAMIC AND METHOD FOR PREPARATION

[75] Inventor: James D. Hodge, Cohoes, N.Y.

[73] Assignee: General Electric Company, Schenectady, N.Y.

[21] Appl. No.: 616,748

[22] Filed: Jun. 4, 1984

[51] Int. Cl.$^3$ ............................................. C04B 35/18
[52] U.S. Cl. ....................................... 501/9; 501/119; 501/128; 264/65; 264/66; 264/235; 264/346
[58] Field of Search .................... 501/5, 9, 119, 128; 264/65, 66, 235, 346

[56] References Cited

U.S. PATENT DOCUMENTS

| | | | |
|---|---|---|---|
| 3,252,778 | 5/1966 | Goodman et al. | 501/5 |
| 3,268,315 | 8/1966 | Stookey | 501/5 |
| 3,282,711 | 11/1966 | Lin | 501/5 |
| 3,615,778 | 11/1971 | Albert | 264/66 |
| 3,725,091 | 4/1973 | Chyung et al. | 501/9 |
| 3,804,608 | 4/1974 | Gaskell et al. | 501/5 |
| 4,272,500 | 6/1981 | Eggerding et al. | 501/5 |
| 4,279,654 | 7/1981 | Yajima et al. | 264/62 |
| 4,280,845 | 7/1981 | Matsuhisa et al. | 264/66 |
| 4,295,892 | 10/1981 | Matsuhisa | 501/119 |

FOREIGN PATENT DOCUMENTS 1033490 6/1978 Canada ................................. 501/1

OTHER PUBLICATIONS

"Advance Materials for Optical Windows", G. A. Slack, General Electric Technical Information Series, Jun. 1979.

A. G. Gregory & T. J. Veasey, Review: The Crystallisation of Cordierite Glass", Journal of Materials Science 6, (1971), pp. 1312–1321.

B. H. Mussler & M. W. Shafer, "Preparation and Properties of Mullite-Cordierite Composites", Ceramic Bulletin, vol. 63, No. 5, pp. 705–710, (1984).

Primary Examiner—Howard S. Williams
Assistant Examiner—Terryence Chapman
Attorney, Agent, or Firm—Jane M. Binkowski; James C. Davis, Jr.; James Magee, Jr.

[57] ABSTRACT

Method for producing a polycrystalline body comprised of from about 50% by weight to about 95% by weight of mullite and from about 5% by weight to about 50% by weight of cordierite, said body having a porosity of less than about 10% by volume.

29 Claims, 2 Drawing Figures

MULLITE-CORDIERITE COMPOSITE CERAMIC AND METHOD FOR PREPARATION

The present invention relates to the production of a polycrystalline body, i.e. a composite ceramic, comprised of a mullite phase and a cordierite phase. In a preferred embodiment, the present invention relates to the production of a polycrystalline material comprised of mullite and cordierite useful as a substrate for silicon with a thermal expansion coefficient identical or close to that of silicon.

To minimize stress at the silicon-substrate interface of an IC device during operation, it is desired that the substrate material have a thermal expansion coefficient which matches that of silicon as closely as possible. Such a match is expected to be especially critical in projected high power semiconductor devices where heating and cooling cycles during operation of the device are expected to subject the silicon-substrate interface to more severe thermal stresses than are encountered in present devices. Present technology utilizes alpha alumina as the substrate material. However, the thermal expansion mismatch between alumina and silicon is judged to be too great for this material to be satisfactory for future applications. In addition, high speed integrated circuits require a substrate material with a low dielectric constant. For projected high speed devices, alumina is judged to have too high of a dielectric constant. A replacement substrate material for alumina is then needed whose thermal expansion coefficient provides a closer match to that of silicon and whose dielectric constant is lower than that of alumina.

Mullite composite substrate materials have been investigated in the past. Leipold and Sibold, J. Amer. Ceram. Soc., 65, C147 (1982), report making a two phase mullite based ceramic with a thermal expansion coefficient close to that of silicon by preparing a silica-rich mullite composition. After firing, this resulted in a body consisting of mullite and a silica-rich glass which contained approximately 50% glass. Fiori and Vincenzini, Collogque Internationale sur les Nouvelles Orientations des Compososants Possifs, p. 203, Paris, Mar. 29–Apr. 1, 1982, also report making similar mullite-silica glass compositions for use as a substrate material with a thermal expansion to match that of silicon.

Mullite is a crystalline aluminum silicate phase which has the approximate chemical formula, $3\,Al_2O_3 \cdot 2SiO_2$. It is a potential substrate material as its thermal expansion coefficient is a reasonable match for that of silicon ($3.3 \times 10^{-6}/°K$. at 300° K. for mullite vs. $2.5 \times 10^{-6}/°K$. at 300° K. for silicon). However, as discussed above, a closer match than this is desired for substrates for projected high power devices. Therefore, according to one aspect of the present invention, the thermal expansion coefficient of mullite is lowered to match that of silicon through the addition of a second phase having a low thermal expansion coefficient. Specifically, in accordance with the copresent invention, cordierite (a magnesium aluminum silicate) is added. Cordierite has a thermal expansion coefficient of $0.5 \times 10^{-6}/°K$. at 300° K.

Figure 2:
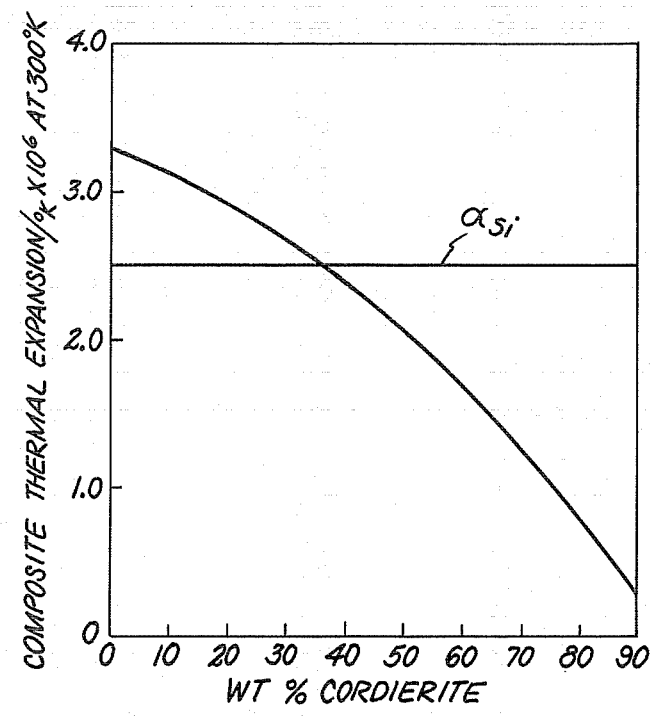

Those skilled in the art will gain a further and better understanding of the present invention from the detailed description set forth below, considered in conjunction with the figures accompanying and forming a part of the specification, in which:

FIG. 1 is a photomicrograph (magnified 1500×) showing the polished cross-section of a composite ceramic produced in accordance with the present invention comprised of about 62.3% by weight of mullite phase (lighter phase), about 35.1% by weight of cordierite (darker colored phase) and about 2.6% by weight of a $TiO_2$ phase which are the tiny circles, i.e. particles of $TiO_2$; and FIG. 2 is a graph showing the calculated thermal expansion coefficient of the present polycrystalline body as a function of its cordierite content. Specifically, in FIG. 2, using the formula for the thermal expansion coefficient for a multiphase body originally derived by Turner, J. Res. NBS, 37, 239 (1946), the thermal expansion of a mullite-cordierite ceramic was calculated at 300° K. FIG. 2 shows the results of such a calculation compared with the thermal expansion coefficient of silicon at 300° K. These calculations indicate that for the present composite ceramic to match the thermal expansion of silicon, it would need to have a content of about 36 wt % cordierite.

In accordance with the present invention, a mullite-cordierite ceramic can be fabricated to match the thermal expansion coefficient of silicon. An advantage of the present mullite-cordierite ceramic over the mullite-glass ceramics is that the present ceramic has a potentially higher thermal conductivity because of the higher thermal conductivity of the crystalline ceramics over the glass.

Briefly stated, the present process for producing a polycrystalline body comprised of from about 50% by weight to about 95% by weight mullite and from about 5% by weight to about 50% by weight cordierite comprises providing a mixture comprised of $Al_2O_3$, MgO and $SiO_2$ and a nucleating agent, said $Al_2O_3$, MgO and $SiO_2$ being used in amounts required to produce said polycrystalline body, shaping said mixture into a compact, sintering said compact at a temperature ranging from about 1290° C. to about 1550° C. at which sufficient liquid phase is generated to liquid phase sinter the compact and produce a densified body having a porosity of less than about 10% by volume of said body, said sintering temperature having no significant deleterious effect on said body, said sintered body containing said mullite phase and a glassy phase of said cordierite, nucleation-annealing said sintered body at a temperature ranging from about 600° C. to about 800° C. to nucleate said glassy cordierite phase, crystallization-annealing the resulting nucleated body at a temperature ranging from about 1200° C. to below the temperature at which liquid forms in said body to produce said polycrystalline body, said nucleating agent being an agent for nucleating said glassy cordierite phase, said nucleating agent being used in an amount sufficient to nucleate said glassy cordierite phase to produce said polycrystalline body, said sintering, said nucleation-annealing and said crystallization-annealing being carried out in an atmosphere or vacuum which has no significant deleterious effect on said compact or body.

In the present invention, the composition of the mullite phase is one which can exist in thermal equilibrium with a cordierite phase. Likewise, the composition of the cordierite phase is one which can exist in thermal equilibrium with the mullite phase. The present polycrystalline body, therefore, is comprised of a mullite phase composed of from about 71.8 weight % to about 73.3 weight % $Al_2O_3$ balance $SiO_2$, and a cordierite phase comprised of a magnesium aluminum silicate with the formula of or about $2MgO \cdot 2Al_2O_3 \cdot 5SiO_2$, i.e. about 13.7 weight % MgO, about 34.9 weight % $Al_2O_3$ and about 51.4 weight % $SiO_2$.

In the present invention, the phase composition of the present polycrystalline body depends largely on its final application. In one embodiment of the present invention, the phase composition of the present polycrystalline body is tailored to match the thermal expansion coefficient of silicon at 300° K.

In carrying out the present process, a uniform or at least a substantially uniform particulate mixture or dispersion of the ingredients or components, i.e. $Al_2O_3$, MgO, $SiO_2$ and nucleating agent, is formed. The particular amount of $Al_2O_3$, MgO and $SiO_2$ used in forming the mixture is determined by the particular phase composition desired in the polycrystalline body. In the present process, there is no significant loss of the reactants, i.e. $Al_2O_3$, MgO and $SiO_2$, forming the mullite and cordierite phases.

The present nucleating agent is one which nucleates the glassy cordierite phase in the present process and has no significant deleterious effect on the body. Representative of such a nucleating agent is titanium dioxide, titanium isopropoxide, lithium fluoride, magnesium fluoride and mixtures thereof. Titanium isopropoxide thermally decomposes below the present sintering temperature to titanium dioxide and by-product gas which vaporizes away.

The particular amount of nucleating agent used is determinable empirically and depends largely on the amount of glassy cordierite phase present. The nucleating agent must be present in at least an amount which nucleates the glassy cordierite phase sufficiently to allow its crystallization to produce the present polycrystalline body. Generally, in the present process, the nucleating agent is used in an amount ranging from about 5% by weight to about 10% by weight, preferably from about 6% by weight to about 8% by weight, and more preferably about 7.5% by weight, of the total weight of the glassy cordierite phase in the body. An amount of nucleating agent less than about 5% by weight may not be enough to be operable whereas an amount in excess of about 10% by weight may effect the properties of the final product, i.e. particularly its thermal and electrical properties. Specifically, the nucleating agent should not be used in an amount which has a significantly deleterious effect on the present polycrystalline body.

The components of the mixture can be of commercial or technical grade. Specifically, they should not contain any impurities which would have a significantly deleterious effect on the properties of the resulting polycrystalline body. The larger the amount of impurities in the starting materials, the greater is the amount of glassy phase in the final product.

The present mixture of components or ingredients can be formed by a number of conventional techniques such as, for example, ball milling or jet milling. Representative of the mixing techniques is ball milling, preferably with balls of a material such as $\alpha\text{-}Al_2O_3$ which has low wear and which has no significant detrimental effect on the properties desired in the final product. Preferably, milling is carried out in a liquid mixing medium which is inert to the ingredients. Typical liquid mixing mediums include hydrocarbons such as benzene and chlorinated hydrocarbons. The resulting wet milled material can be dried by a number of conventional techniques to remove the liquid medium. Preferably, it is dried in an oven maintained just below the boiling point of the liquid mixing medium.

The particulate components of the present mixture should be of a size which allows the present reaction, i.e. formation of mullite and cordierite phases, to take place. Preferably, the present starting components or mixture thereof have an average particle size which is submicron.

A number of techniques can be used to shape the particulate mixture into a compact. For example, the mixture can be extruded, injection molded, die-pressed, isostatically pressed, slip cast or tape cast to product the compact of desired shape. Any lubricants, binders or similar material used in shaping the mixture should have no significant deteriorating effect on the compact or the resulting polycrystalline body. Such materials are of the type which evaporate away on heating at temperatures below the present sintering temperature, and preferably below 200° C., leaving no significant residue or any effective contaminants.

The shaped compact can be in any desired form. For example, it can be simple, hollow and/or complex in shape. Preferably, for use as a substrate, it is in the form of a tape.

The compact is sintered at a temperature at which sufficient liquid phase is generated to carry out the present liquid phase sintering and such sintering temperature can range from about 1290° C. to about 1550° C. The sintering temperature should have no significantly deleterious effect on the compact or body, i.e., the sintering temperature should not generate so much liquid phase as to slump the compact or body. Specifically, the particular sintering temperature used depends largely on the amount of liquid phase generated at such temperature for the particular composition of the compact. For the present composition, where the nucleating agent has no effect on sintering temperature, the sintering temperature is one at which the glassy cordierite is molten, and in such instance it ranges from higher than about 1465° C. to about 1550° C. Temperatures higher than about 1550° C. are not operable because they generate so much liquid phase as to slump the compact or body. With increasing temperatures, increasing amounts of mullite dissolve in the molten cordierite generating more liquid at the higher sintering temperatures.

Generally, however, the nucleating agent lowers the present sintering temperature. For example, when titanium dioxide or titanium isopropoxide are used as nucleating agents in the present invention, the present sintering temperature ranges from about 1450° C. to about 1490° C., and temperatures higher than about 1490° C. generate so much liquid as to slump the compact or body. On the other hand, when lithium fluoride is the nucleating agent, the present sintering temperature ranges from about 1290° C. to about 1340° C., and temperatures higher than about 1340° C. generate so much liquid as to slump the compact or body. When magnesium fluoride is the nucleating agent, the present sintering temperature ranges from about 1390° C. to about 1490° C., and temperatures higher than about 1490° C. generate so much liquid as to slump the compact or body. Mixtures of nucleating agents can be used to attain a desired sintering temperature. During sintering, the liquid formed is comprised primarily of molten cordierite with a minor amount of dissolved mullite and nucleating agent.

The present sintering is carried out to produce a sintered body having a porosity of less than about 10% by volume, preferably less than about 5% by volume, and more preferably less than about 2% by volume, of the total volume of the sintered body. Sintering time is determinable empirically. Generally, a sintering time of about two to ten hours is satisfactory.

The sintered body, which is comprised of crystalline mullite phase and a glassy cordierite phase, is nucleation-annealed to nucleate the glassy cordierite phase sufficiently to allow its crystallization to produce the present polycrystalline body. Specifically, the sintered body is annealed at a temperature ranging from about 600° C. to about 800° C., preferably from about 650° C. to about 750° C., and most preferably, it is annealed at about 700° C. At a temperature below about 600° C., the rate of nucleation is too slow to be useful whereas a temperature higher than about 800° C. is not operable in the present process.

Nucleation-annealing time is determinable empirically by standard techniques such as, for example, by observations of the degree to which the final product is crystallized. Generally, a nucleation-annealing time period of about two hours is satisfactory at about 700° C.

The nucleation-annealed sintered body is then crystallization-annealed to crystallize the nucleated glassy cordierite phase to produce the present polycrystalline body. Specifically, the nucleation-annealed sintered body is crystallization-annealed at a temperature ranging from about 1200° C. to a temperature at which the body remains totally solid. More specifically, the present crystallization-annealing is carried out at a temperature ranging from about 1200° C. up to a temperature at which any liquid forms in the body, i.e. from about 1200° C. to a temperature below the liquid-forming temperature, and such maximum crystallization-annealing temperature depends on the particular composition of the body being annealed. For example, when the nucleating agent has no effect on the temperature at which liquid forms in the present system, the crystallization-annealing temperature ranges from about 1200° C. to a temperature below the melting point of pure cordierite, i.e. below about 1460° C. However, when the nucleating agent does have an effect on the temperature at which liquid forms in the present system, the crystallization-annealing temperature ranges from about 1200° C. to that temperature below the liquid forming temperature of that particular composition. For example, when $TiO_2$ is used as the nucleating agent in the present invention, the maximum crystallization-annealing temperature would be below about 1450° C. When lithium fluoride is used as the nucleating agent in the present invention, the maximum crystallization-annealing temperature would be below about 1290° C. When magnesium fluoride is the nucleating agent, the maximum crystallization-annealing temperature would be below about 1390° C. At a temperature lower than about 1200° C. the rate of such crystallization is too slow to be useful.

Crystallization-annealing time is determinable empirically by standard techniques such as, for example, by observations of the degree to which the final product is crystallized. Generally, a crystallization-annealing time of about two hours is satisfactory.

The present sintering, nucleation-annealing and crystallization-annealing is carried out in an atmosphere or a vacuum which has no significantly deleterious effect on the compact or body. Representative of a useful atmosphere is air, hydrogen, wet hydrogen, nitrogen, argon and mixtures thereof. When a sintering atmosphere is used, it is preferably at ambient pressure since there is no advantage in using a pressure higher than ambient. Preferably, to produce a more highly dense sintered body, sintering is carried out in a vacuum below about 200 microns of Hg.

In one preferred embodiment, the present sintering, nucleation-annealing and crystallization-annealing are carried out in a single run using the same atmosphere or vacuum throughout the run.

The present polycrystalline body is comprised of mullite and cordierite phases, and more specifically, it has a phase composition comprised of polycrystalline mullite in an amount ranging from about 50% by weight to about 95% by weight of the total weight of the body and polycrystalline cordierite in an amount ranging from about 5% by weight to about 50% by weight of the total weight of the body.

The present polycrystalline body has a porosity of less than about 10% by volume, preferably less than about 5% by volume, and more preferably less than about 2% by volume of the total volume of said body.

In a preferred embodiment, the present polycrystalline body has a phase composition comprised of polycrystalline mullite ranging from about 60% by weight to about 70% by weight of the total weight of the body, and polycrystalline cordierite ranging from about 30% by weight to about 40% by weight of the total weight of the body, and has a thermal expansion coefficient within about 10% of that of silicon at 300° K.

In a more preferred embodiment, the present polycrystalline body has a phase composition comprised of about 64% by weight of polycrystalline mullite and about 36% by weight of polycrystalline cordierite, and has a thermal expansion coefficient within about 5% of that of silicon at 300° K.

The present polycrystalline body can contain a glassy phase in an amount of less than about 5% by volume, preferably less than about 2% by volume, and more preferably less than about 1% by volume, of the total volume of said body. Even more preferably, the present polycrystalline body contains only a detectable amount of glassy phase. Therefore, glassy phase in the present polycrystalline body can range from a detectable amount up to about 5% by volume of the total volume of the body. The amount of glassy phase present in the present polycrystalline body depends largely on the impurities in the starting materials.

The present polycrystalline body may or may not contain a minor amount of a phase comprised of the nucleating agent, and the presence of such phase depends largely on the particular nucleating agent used, i.e. the extent to which the nucleating agent vaporizes away, if at all, during the present process. Specifically, the present polycrystalline body contains a phase of nucleating agent ranging from none to about 5% by weight of the total weight of the body. In one embodiment, the present polycrystalline body contains a phase of nucleating agent ranging from about 0.5% by weight to about 5% by weight of the body. In another embodiment, the present polycrystalline body contains a phase of nucleating agent ranging from about 0.6% by weight to about 4% by weight of the body. In yet another embodiment, the present polycrystalline body contains a phase of nucleating agent of from about 0.75% by weight to about 3.25% by weight of the body. For example, in the present process the fluoride nucleating agents vaporize significantly and are not detectable as a phase in the present polycrystalline body using standard techniques such as, for example, X-ray diffraction analysis or by optically examining the microstructure. On the other hand, a nucleating agent such as titanium dioxide does not appear to vaporize away to any significant extent in the present process and does leave a $TiO_2$ phase in the final product which corresponds, or substantially corresponds, to the amount of $TiO_2$ present before sintering. The $TiO_2$ phase is barely detectable in X-ray diffraction patterns and can range from about 0.5% by weight to about 5% by weight of the total weight of the final product, i.e. of the present polycrystalline body.

In the present polycrystalline body, the phases are distributed uniformly, substantially uniformly or at least significantly uniformly. Also, the present polycrystalline body has a uniform, substantially uniform or at least a significantly uniform microstructure.

The cordierite phase in the present polycrystalline body can be discontinuous or continuous. Specifically, in the present polycrystalline body, when the cordierite phase ranges from about 5% by weight to about 10% by weight of the body, it is discontinuous. As the cordierite phase increases in amount from 10% by weight of the body, it exhibits some continuity, and at about 15% by weight of the body, it is likely to be continuous and interconnecting. The cordierite phase ranging in amount from in excess of 15% by weight to about 50% by weight of the body is continuous and interconnecting and envelops small islands of the mullite phase.

The present polycrystalline body has a number of uses, but because of its relatively low thermal expansion coefficient and dielectric constant, it is particularly useful as a substrate material, especially as a supporting substrate for semiconductors in information processing equipment such as computers. Specifically, the present polycrystalline body has a thermal expansion coefficient of less than $3.3 \times 10^{-6}/°K$. at 300° K., and its thermal expansion coefficient decreases as its content of cordierite increases. This is illustrated by the calculated graph of FIG. 2. The present polycrystalline body containing about 5% by weight cordierite would have a thermal expansion coefficient of about $3.2 \times 10^{-6}/°K$. at 300° K., and the present body containing about 50% by weight cordierite would have a thermal expansion coefficient of about $2 \times 10^{-6}/°K$. at 300° K.

The present polycrystalline body has a dielectric constant ranging from higher than 5 to lower than 7 at 300° K. The dielectric constant is a function of the amount of cordierite present. The more cordierite present, the lower is the dielectric constant of the present body.

The present polycrystalline body can be in any desired form. For example, it can be simple, hollow and/or complex in shape. Preferably, for use as a substrate, it is in the form of a tape.

The invention is further illustrated by the following examples wherein the procedure was as follows unless otherwise stated:

All firing of the compact or body was carried out in a molybdenum disilicide resistance furnace.

At the end of each run, the power was switched off and the body was furnace-cooled to room temperature.

The porosity of the body was measured by optical microscopy using standard techniques.

Phase composition of the final product was determined by standard metallographic techniques such as optical microscopy and/or X-ray diffraction analysis.

Thermal expansion coefficient was measured at 300° K. in an quartz dilatometer.

EXAMPLE 1

A starting powder corresponding to a composition of 64% by weight mullite and 36% by weight cordierite was prepared from high-purity (greater than 99% pure) oxide powders of aluminum oxide, silicon oxide and magnesium oxide. $TiO_2$ was used as a nucleating agent. Specifically, 57.0% by weight of $Al_2O_3$ with an average particle size of about $0.15\mu$, 35.6% by weight of $SiO_2$ with an average particle size of about $1.0\mu$, 4.8% by weight of MgO with an average particle size of about $0.5\mu$ and 2.6% by weight of $TiO_2$ of 99% purity with an average particle size of about $0.1\mu$ were ball-milled using alumina media in acetone with a polyacrylic acid added as a dispersant. After milling for 3 hours, the solvent was removed by drying in air at about 40° C. The resulting powder mixture was substantially uniform and had an average particle size of about $0.5\mu$.

The powder mixture was pressed into pellets at ambient temperature under a pressure of about 20,000 psi. Each pellet was in the form of a disc of substantially the same size of about ½ inch in diameter and about ⅛ inch in thickness.

One disc was sintered at 1490° C. for two hours. The temperature was then lowered to 700° C. where it was held for 2 hours to nucleate the glassy cordierite phase. The temperature was then raised to 1300° C. where it was held for 2 hours to crystallize the cordierite phase. The disc was then furnace cooled to ambient temperature. All firing, i.e. sintering, nucleation- and crystallization-annealing was carried out in air at ambient pressure, and the fired disc was furnace cooled in the same atmosphere.

A polished cross-section of the resulting fired disc, i.e. the present polycrystalline body, is shown in FIG. 1. FIG. 1 shows that the disc is comprised of mullite (lighter phase), cordierite (darker colored phase) and a minor amount of $TiO_2$ phase (tiny circles).

FIG. 1 illustrates that the present body of this composition has a continuous interconnecting phase of cordierite enveloping islands of the mullite phase.

The fired disc had a porosity of about 5.3% by volume of the body. It was comprised of about 62.3% by weight of crystalline mullite, about 35.1% by weight of crystalline cordierite and about 2.6% by weight of crystalline $TiO_2$ phase. The mullite had a composition of about 71.8% by weight $Al_2O_3$ balance $SiO_2$ and the cordierite had a composition of about 13.7 weight % MgO, about 34.9 weight % $Al_2O_3$ and about 51.4 weight % $SiO_2$.

The disc had a thermal expansion coefficient at 300° K. of $2.5 \pm 0.1 \times 10^{-6}/°K$. which matches that of silicon at 300° K.

This disc would be useful as a supporting substrate for a silicon chip for use in ceramic packaging for use in computers.

This example is illustrated in Table I.

Examples 2–10 of Table I were carried out in substantially the same manner as Example 1 except as noted in Table I and except as noted herein. Specifically, in Example 4 lithium fluoride was used instead of titanium dioxide; in Example 5, magnesium fluoride was used instead of titanium dioxide; and in Example 8, a mixture of titanium dioxide and lithium fluoride was used instead of titanium dioxide alone. The lithium fluoride and magnesium fluoride had an average particle size of about 1.0 micron and were greater than 99% pure.

In Example 6, a slip composition was prepared to cast a tape. The slip was comprised of 57 grams Al$_2$O$_3$, 35.6 grams SiO$_2$, 4.8 grams MgO, 2.6 grams TiO$_2$, 5.0 grams polyvinylbutanol, 4.0 cc polyethylene glycol, 5.0 cc glycerine trioleate, 1.0 cc dioctylphthalate and 60 cc toluene. The polyvinyl butanol functioned as a binder, i.e. it was substantially a solid at room temperature, but soluble in the toluene. The polyethylene glycol, glycerine trioleate and dioctylphthalate were plasticizers.

The slip was cast at ambient temperature on the surface of a glass substrate where it was allowed to dry to remove the solvent. The resulting dried green tape was of substantially uniform thickness of about 0.019" and it was about 1 foot square. It was lifted from the glass and fired as shown in Table I. Its organic content vaporized away before sintering temperature was reached. The final fired tape, i.e. the present polycrystalline body, had a thickness of 0.009".

In Example 7, the compact was first fired at 1480° C. for 15 minutes in a vacuum of about 10 microns Hg, the firing atmosphere was then changed to air at ambient pressure, the temperature was then raised to 1490° C. and the firing schedule was then as shown in Table I.

In Example 8, the compact was prefired in air at ambient pressure at a temperature of 1300° C. for 5 hours, the temperature was then raised to 1490° C. and the firing schedule was then as shown in Table I.

fired body did not contain the present crystalline cordierite phase.

In Example 10, no nucleating agent was used, and the present polycrystalline body was not produced.

EXAMPLE 11

Two pellets, i.e. green discs, were prepared according to the present invention according to the disclosure of Example 1. Each disc had the same composition as disclosed for Example 1.

Tungsten ink in the form of an X was brushed on one surface on one of the discs. A sandwich of the two discs with the deposited tungsten ink between them was formed and sintered at 1490° C. for two hours. The temperature was then lowered to 700° C. where it was held for 2 hours to nucleate the glassy cordierite phase. The temperature was then raised to 1300° C. where it was held for 2 hours to crystallize the cordierite phase. The resulting fired body was then furnace cooled to ambient temperature. All firing, i.e. sintering, nucleation- and crystallization-annealing was carried out in wet hydrogen having a dew point of 25° C. at ambient pressure, and the fired body was cooled in the same atmosphere.

The resulting product, i.e. body, had a density greater than 96% of theoretical, i.e. its porosity was less than 5% by volume of the total volume of the body.

The low oxygen partial pressure, which was necessary to prevent the oxidation of the tungsten, resulted in

TABLE I

| | Starting Composition | | | | | | | Sintering | | Nucleation Annealing | | Crystallization Annealing | |
|---|---|---|---|---|---|---|---|---|---|---|---|---|---|
| Example | Al$_2$O$_3$ wt % | SiO$_3$ wt % | MgO wt % | TiO$_2$ wt % | LiF wt % | MgF$_2$ wt % | Method of Forming | Temp °C. | Time hr. | Temp °C. | Time hr. | Temp °C. | Time hr. |
| 1 | 57.0 | 35.6 | 4.8 | 2.6 | — | — | Pressing 20 ksi | 1490 | 2 | 700 | 2 | 1300 | 2 |
| 2 | 57.0 | 35.6 | 4.8 | 2.6 | — | — | Pressing 20 ksi | 1490 | 2 | 700 | 2 | 1200 | 2 |
| 3 | 57.0 | 35.6 | 4.8 | 2.6 | — | — | Pressing 20 ksi | 1490 | 2 | 700 | 2 | 1300 | 2 |
| 4 | 57.0 | 35.6 | 4.8 | — | 2.6 | — | Pressing 20 ksi | 1290 | 2 | 700 | 2 | 1200 | 2 |
| 5 | 57.0 | 35.6 | 4.8 | — | — | 2.6 | Pressing 20 ksi | 1390 | 2 | 700 | 2 | 1200 | 2 |
| 6 | 57.0 | 35.6 | 4.8 | 2.6 | — | — | Tape Cast | 1490 | 2 | 700 | 2 | 1300 | 2 |
| 7 | 57.0 | 35.6 | 4.8 | 2.6 | — | — | Pressing 20 ksi | 1490* | 2 | 700 | 2 | 1300 | 2 |
| 8 | 56.8 | 35.5 | 4.8 | 2.6 | 0.3 | — | Pressing 20 ksi | 1490** | 2 | 700 | 2 | 1300 | 2 |
| 9 | 57.0 | 35.6 | 4.8 | 2.6 | — | — | Pressing 20 ksi | 1490 | 2 | — | — | 1300 | 2 |
| 10 | 58.5 | 36.6 | 4.9 | — | — | — | Pressing 20 ksi | 1490 | 2 | 700 | 2 | 1300 | 2 |

| | | Final Fired Body | | | | | |
|---|---|---|---|---|---|---|---|
| | | Phase Composition | | | | Thermal Expansion | Dielectric |
| Example | Firing Atmosphere | Mullite wt % | Cordierite wt % | Other wt % | Porosity vol % | Coefficient @ 300° K. | Constant @ 25° C. |
| 1 | air | ~62.3 | ~35.1 | ~2.6(TiO$_2$) | 5.3 | 2.5 ± 0.1 × 10$^{-6}$/°K. | |
| 2 | air | " | " | " | 6.3 | | |
| 3 | H$_2$ | " | " | " | 8.7 | | |
| 4 | air | ~64 | ~36 | — | | | |
| 5 | air | " | " | — | | | |
| 6 | air | ~62.3 | ~35.1 | ~2.6(TiO$_2$) | 8.0 | | 6.2 |
| 7 | air | " | " | " | 1.3 | | |
| 8 | air | " | " | " | 2.3 | | |
| 9 | air | ~64 | — | ~36(Glass) | | | |
| 10 | air | ~64 | — | ~36(Glass) | | | |

*run included a 15 min. prefire in vacuum at 1480° C.
**run included a 5 hr. prefire at 1300° C. in air Examples 1–8 of Table I illustrate the present invention. All of the final fired bodies of Examples 1–8, i.e. the present polycrystalline bodies, would be useful as a substrate for a semiconductor such as a silicon chip. Based on other work, the porosity of the polycrystalline bodies of Examples 4 and 5 would have a porosity of less than about 10% by volume of the body.

Example 9 illustrates the importance of the present nucleation-annealing. Specifically, in Example 9, the sintered body was not nucleation-annealed and the final some volatization of SiO from the surface of the ceramic. However, this resulted only in the slight depletion of cordierite only on the surface as indicated by X-ray diffraction and was not considered significant.

The resulting fired ceramic product had an electrical resistivity on the order of 10$^{13}$ ohms at 25° C. The tungsten interconnects sintered to sufficient density to provide a continuous electrical pathway through the assembly. The high resistivity of the ceramic in conjunction with the electrical continuity of the tungsten illustrate the usefulness of the present polycrystalline body in ceramic packaging of semiconductors.

The fired polycrystalline body was comprised of about 62.3% by weight of mullite, about 35.1% by weight of cordierite and about 2.6% by weight of $TiO_2$ phase.

EXAMPLE 12

A starting powder corresponding to 64 weight % mullite and 36 weight % cordierite was prepared.

In this example, there was used, in the proper ratio to produce such starting powder, a colloidal aluminum monohydroxide (CATAPAL SB), colloidal silica (Cab-O-Sil), and a colloidal magnesium hydroxide which was prepared by precipitating a solution of magnesium nitrate with a concentrated ammonia solution. These materials were dispersed in a nitric acid solution with a pH of about 3 and subsequently gelled by the addition of concentrated ammonia. The gel was then frozen and allowed to thaw. This step aided in the subsequent filtration of the gel. During filtering of the thawed gel, the filtercake was washed with acetone to insure the complete removal of all water prior to drying. The filtercake was then allowed to dry at room temperature. After drying, the resultant powder was calcined at 500° C. in air at ambient pressure for about 10 hours to decompose the hydroxides. Following calcination, the powder, which had an average particle size on the order of 200 Angstroms, was pressed into pellets at 100,000 psi at ambient temperature. Each pellet was in the form of a disc of substantially the same size of about ½ inch in diameter and about ⅛ inch in thickness.

One disc was sintered at 1490° C. for two hours. The temperature was then lowered to 700° C. where it was held for 2 hours to nucleate the glassy cordierite phase. The temperature was then raised to 1300° C. where it was held for 2 hours to crystallize the cordierite phase. The disc was then furnace cooled to ambient temperature. All firing, i.e. sintering, nucleation- and crystallization-annealing was carried out in air at ambient pressure, and the fired disc was furnace cooled in the same atmosphere.

The fired disc, i.e. the present polycrystalline body, had a porosity of about 5.3% by volume of the body. It was comprised of about 62.3% by weight of crystalline mullite, about 35.1% by weight of crystalline cordierite and about 2.6% by weight of crystalline $TiO_2$ phase. This fired disc appeared to be the same as that produced in Example 1.

This disc would be useful as a supporting substrate for a silicon chip for use in ceramic packaging for use in computers.

EXAMPLE 13

In this example, the process and procedure were the same as disclosed in Example 12 except that the calcined powder was pressed into a pellet at 50,000 psi.

The resulting fired disc, i.e. the present polycrystalline body, did not differ in any significant manner from that produced in Example 1.

What is claimed is:

1. A polycrystalline body comprised of crystalline mullite phase in an amount ranging from about 50% by weight to about 95% by weight of the total weight of the body and crystalline cordierite phase in an amount ranging from about 5% by weight to about 50% by weight of the total weight of the body, said mullite phase being comprised of from about 71.8 weight % to about 73.3 weight % $Al_2O_3$ balance $SiO_2$, said cordierite phase being comprised of about 13.7 weight % MgO, about 34.9 weight % $Al_2O_3$ and about 51.4 weight % $SiO_2$, said body having a porosity of less than about 10% by volume of the total volume of said body.

2. A polycrystalline body comprised of crystalline mullite ranging from about 60% by weight to about 70% by weight of the total weight of the body, and crystalline cordierite ranging from about 30% by weight to about 40% by weight of the total weight of the body, said body having a porosity of less than about 10% by volume of the total volume of said body, said body having a thermal expansion coefficient within about 10% of that of silicon at 300° K.

3. The polycrystalline body of claim 2 in the form of a tape.

4. A polycrystalline body comprised of crystalline mullite in an amount ranging from about 50% by weight to about 95% by weight of the total weight of the body, crystalline cordierite in an amount ranging from about 5% by weight to about 50% by weight of the total weight of the body, a phase consisting essentially of a nucleating agent useful for nucleating glassy cordierite phase, said phase of nucleating agent ranging up to about 5% by weight of said body, and a glassy phase ranging from a detectable amount up to about 5% by volume of the total volume of said body, said body having a porosity of less than about 10% by volume of the total volume of said body.

5. The polycrystalline body of claim 4 in the form of a tape.

6. The polycrystalline body of claim 4 wherein said phase of nucleating agent is $TiO_2$.

7. The polycrystalline body of claim 4 wherein said body has a thermal expansion coefficient of less than $3.3 \times 10^{-6}/°K.$ at 300° K.

8. The polycrystalline body according to claim 4 wherein said porosity is less than about 2% by volume of the total volume of said body.

9. A polycrystalline body comprised of crystalline mullite in an amount of about 64% by weight of the total weight of the body, said crystalline cordierite in an amount of about 36% by weight of the total weight of the body, said body having a porosity of less than about 5% by volume of the total volume of said body, said body having a thermal expansion coefficient within about 5% of that of silicon at 300° K.

10. A polycrystalline body comprised of crystalline mullite in an amount ranging from about 50% by weight to about 95% by weight of the total weight of the body and crystalline cordierite in an amount ranging from about 5% by weight to about 50% by weight of the total weight of the body, said body having a porosity of less than about 10% by volume of the total volume of said body, said body having a thermal expansion coefficient of less than $3.3 \times 10^{-6}/°K.$ at 300° K.

11. The polycrystalline body of claim 10 in the form of a tape.

12. A process for producing a polycrystalline body comprised of from about 50% by weight to about 95% by weight of crystalline mullite and from about 5% by weight to about 50% by weight of crystalline cordierite which comprises providing a mixture comprised of $Al_2O_3$, MgO and $SiO_2$ and a nucleating agent, said $Al_2O_3$, MgO and $SiO_2$ being used in amounts required to produce said polycrystalline body, shaping said mixture into a compact, sintering said compact at a temperature ranging from about 1290° C. to about 1550° C. at which sufficient liquid phase is generated to liquid phase sinter the compact and produce a densified body having a porosity of less than about 10% by volume of said body, said sintered body containing said mullite phase and a glassy phase of said cordierite, nucleation-annealing said sintered body at a temperature ranging from about 600° C. to about 800° C. to nucleate said glassy cordierite phase, crystallization-annealing the resulting nucleated body at a temperature ranging from about 1200° C. to below the temperature at which liquid forms in said body to produce said polycrystalline body, said nucleating agent being an agent for nucleating said glassy cordierite phase, said nucleating agent being used in an amount sufficient to nucleate said glassy cordierite phase to produce said polycrystalline body.

13. The process according to claim 1 wherein said nucleation-annealing temperature ranges from about 650° C. to about 750° C.

14. The process according to claim 12 wherein said sintering, said nucleation-annealing and said crystallization-annealing is carried out in an atmosphere selected from the group consisting of air, hydrogen, wet hydrogen, nitrogen, argon and mixtures thereof.

15. The process according to claim 1 wherein said compact is in the form of a tape.

16. The process according to claim 1 wherein said polycrystalline body is comprised of from about 60% by weight to about 70% by weight of said mullite and from about 30% by weight to about 40% by weight of said cordierite.

17. The process according to claim 1 wherein said polycrystalline body is comprised of about 64% by weight of said mullite and about 36% by weight of said cordierite.

18. The process according to claim 12 wherein said sintering, said nucleation-annealing and said crystallization-annealing is carried out in air.

19. The process according to claim 12 wherein said sintering, said nucleation-annealing and said crystallization-annealing is carried out in wet hydrogen.

20. The process according to claim 12 wherein said sintering, said nucleation-annealing and said crystallization-annealing is carried out in a vacuum below about 200 microns of Hg.

21. A process for producing a polycrystalline body comprised of from about 50% by weight to about 95% by weight of crystalline mullite and from about 5% by weight to about 50% by weight of crystalline cordierite which comprises providing a mixture comprised of $Al_2O_3$, MgO and $SiO_2$ and a nucleating agent, said $Al_2O_3$, MgO and $SiO_2$ being used in amounts required to produce said polycrystalline body, said nucleating agent being selected from the group consisting of titanium dioxide, titanium isopropoxide, lithium fluoride, magnesium fluoride and mixtures thereof, shaping said mixture into a compact, sintering said compact at a temperature ranging from about 1290° C. to about 1490° C. at which sufficient liquid phase is generated to liquid phase sinter the compact and produce a densified body having a porosity of less than about 10% by volume of said body, said sintered body containing said mullite phase and a glassy phase of said cordierite, nucleation-annealing said sintered body at a temperature ranging from about 600° C. to about 800° C. to nucleate said glassy cordierite phase, crystallization-annealing the resulting nucleated body at a temperature ranging from about 1200° C. to below the temperature at which liquid forms in said body, said nucleating agent being used in an amount sufficient to nucleate said glassy cordierite phase to produce said polycrystalline body.

22. The process according to claim 21 wherein said nucleation-annealing temperature ranges from about 650° C. to about 750° C.

23. The process according to claim 21 wherein said sintering, said nucleation-annealing and said crystallization annealing is carried out in an atmosphere selected from the group consisting of air, hydrogen, wet hydrogen, nitrogen, argon and mixtures thereof.

24. The process according to claim 21 wherein said compact is in the form of a tape.

25. The process according to claim 21 wherein said polycrystalline body is comprised of from about 60% by weight to about 70% by weight of said mullite and from about 30% by weight to about 40% by weight of said cordierite.

26. The process according to claim 21 wherein said polycrystalline body is comprised of about 64% by weight of said mullite and about 36% by weight of said cordierite.

27. The process according to claim 21 wherein said sintering, said nucleation-annealing and said crystallization-annealing is carried out in air.

28. The process according to claim 21 wherein said sintering, said nucleation-annealing and said crystallization annealing is carried out in wet hydrogen.

29. The process according to claim 21 wherein said sintering, said nucleation-annealing and said crystallization-annealing is carried out in a vacuum below about 200 microns of Hg.

* * * * *